United States Patent [19]

Sieber et al.

[11] Patent Number: 4,905,015

[45] Date of Patent: Feb. 27, 1990

[54] APPARATUS AND METHOD FOR GENERATING A VARIABLE LINE WIDTH

[76] Inventors: Jonathan D. Sieber, 20 Clubhouse La., Wayland, Mass. 01778; Joseph S. Sieber, 31 Granville Rd., Cambridge, Mass. 02138

[21] Appl. No.: 195,200

[22] Filed: May 18, 1988

[51] Int. Cl.[4] .............................................. G01D 15/16
[52] U.S. Cl. ...................................... 346/1.1; 33/18.1; 346/140 R
[58] Field of Search ........... 346/140 R, 139 C, 139 R, 346/29, 62–64, 1.1; 33/1 M, 18.1

[56] References Cited

U.S. PATENT DOCUMENTS

| | | | |
|---|---|---|---|
| 1,613,970 | 1/1927 | Tanner | 358/298 |
| 3,730,975 | 5/1973 | Kono | 358/303 |
| 4,183,030 | 1/1980 | Kaieda | 346/140 |
| 4,467,525 | 8/1984 | Logan | 33/18.1 |
| 4,607,265 | 8/1986 | Onoda | 346/139 R |
| 4,736,211 | 4/1988 | Sieber | 346/139 R |

*Primary Examiner*—Joseph W. Hartary
*Attorney, Agent, or Firm*—Hale and Dorr

[57] ABSTRACT

The invention is a method and a plotter for automated drawing and writing that provides a drawn line of variable width, where the width is independent of the motion of the plotter pen or the shape of the line drawn. The apparatus includes a plotter having a table for receiving the medium upon which the line will be drawn, a pen slider translatable with respect to the table parallel a first axis (nominally designated the "X" axis) and a pen holder for receiving the pen translatable with respect to the slider parallel a second axis (nominally designated the "Y" axis) that is perpendicular the X axis. The pen holder maintains the pen at a known angular orientation with respect to a third axis (nominally designated the "Z" axis) perpendicular the X and Y axes. The apparatus also includes a digital computer which controls the pen to apply ink of selectable and variable widths along a line, independent of line shape and orientation with respect to the X and Y axes. The computer controls both the angular orientation of the pen tip with respect to the paper and the pressure applied between the pen and the paper, thereby selectably controlling line width.

17 Claims, 7 Drawing Sheets

APPARATUS AND METHOD FOR GENERATING A VARIABLE LINE WIDTH

This invention relates to automated writing and drawing and more particularly, to providing a drawn line of variable width, where the width is independent of the shape of the line and relative direction of motion between the plotter pen and the medium upon which the line is being written. The invention relates most particularly to the field of automated calligraphic writing.

BACKGROUND OF THE INVENTION

Standard graphics X-Y plotters are known, which include one or more felt tip or ball point pens, normally of different colors. The pens may be inserted in a holder on a moving carriage arranged for relative motion with respect to a piece of paper or medium for receiving figures. It will be understood that a plotter may be designed where the paper remains fixed and the pen moves with respect to the paper, for instance in orthogonal directions nominally designated as "X" and "Y". It is also possible to keep the pen fixed and to move the paper in either one or two orthogonal directions and it is similarly possible to constrain the paper in one direction and the pen in an orthogonal direction. In the following discussion, for simplicity, reference will be made only to the orthogonal motion of the pen, however, it will be understood that the discussion also applies to the more general case of the relative motion between the pen and the medium upon which the pen writes. The carriage is controlled to move through a predetermined path to cause the pen to draw desired images on the medium.

It is also known to use a pen, such as a fountain pen, having a radially asymmetric nib in the plotter to produce calligraphic scripts. Applicants' U.S. Pat. No. 4,736,211, "Plotter Pen" issued on Apr. 5, 1988, discloses an apparatus for maintaining a radially asymmetric nib fountain pen in a predetermined desired angular orientation with respect to the paper. It is necessary to maintain angular orientation of the pen when using such a pen with an asymmetrical tip because ink flow varies with angular orientation of the pen. Thus the shape, thickness and intensity of the line being drawn will also vary.

A drawback of the fixed angular orientation device is that the line width depends solely upon the direction of motion of the pen. One effect of this constraint is shown in FIG. 1. In FIG. 1, the fixed orientation of the pen relative to the directions of pen travel X and Y is shown by the diagonal line at A, for instance inclined at an angle +45° to the X axis. The path of motion of the pen is indicated by the small arrows. As the pen moves in a direction parallel to the X axis, the line width is of the relatively broad width shown at B. The line width becomes as narrow as possible when the pen moves at 45° to the X axis, as at C and E. Other line widths are shown at D and F. The broadest width is possible when the pen moves at an angle of −45° with respect to the X axis shown at D and F. Thus, it is not possible to vary the line width in a manner independent the direction of motion of the pen.

Similarly, it is not possible to maintain the line width constant independent the direction of the pen. With reference to the letter "O", with a fixed angle pen, necessarily two portions of the "O" at opposite ends of a diameter will be markedly narrower than corresponding portions 90° around the circumference. It is impossible to write an "O" of a constant line width all the way around the letter's circumference with a pen held at a fixed angle.

It will be understood that many calligraphic hands (the calligraphers'version of fonts) require line widths that are not available at the desired location if the pen is held at a fixed angular orientation. It is possible to vary the orientation using different pens which register with the pen carrier at different angles. However, this requires frequent pen switching and does not provide as much flexibility as is required. Many forms of italic and other hands are unavailable.

Known plotters also apply the pen to the writing medium with a constant pressure. This results in a uniform line width for parallel pen motion. However, there are known calligraphic hands (in particular, those known as "copperplate") which are accomplished by the human calligrapher applying varying degrees of pressure to the pen. The varying pressure changes the imprint of the pen on the paper in a manner (discussed below), that can be finely controlled by the calligrapher. Known plotters are incapable of applying varying pressure, and thus are unable to provide copperplate hands.

Thus, the several objects of the present invention include providing:

an apparatus capable of drawing a variable line width, where the width is independent of the direction of motion of the pen;

an apparatus capable of drawing a curve of constant width where the curve is not limited to a straight line;

an apparatus capable of calligraphic writing of the copperplate style;

an apparatus capable of calligraphic writing of most hands;

an apparatus capable of both italic style and copperplate style line width variations.

an automated method of writing both italic and copperplate style line width variations.

SUMMARY OF THE INVENTION

This invention therefore provides for drawing a variable width line or a line of equal width along its length where the width of the line is independent of the direction of pen travel and line shape.

The apparatus of the invention includes a plotter having a table for receiving the medium upon which the line will be drawn, a slider translatable with respect to the table parallel a first axis (nominally designated the "X" axis) and a pen holder for receiving the pen translatable with respect to the slider parallel a second axis (nominally designated the "Y" axis) that is perpendicular the X axis. The pen holder maintains the pen at a known angular orientation with respect to a third axis (nominally designated the "Z" axis) perpendicular the X and Y axes. The apparatus also includes a digital computer which controls the pen to apply ink of selectable and variable widths along a line, independent of line shape and orientation with respect to the X and Y axes.

In a first preferred embodiment, the pen and penholder is provided on the carriage. The pen is capable of rotating with respect to the pen holder about the Z axis. Means are provided for manipulating the angular orientation of the pen according to a predetermined correspondence between angular orientation and desired line width, such as, for instance, with respect to letters of an alphabet. The desired orientation is accomplished by a flexible sheathed cable having one end fixed to the pen barrel and the other end fixed to a stepping motor or other indexing mechanism controlled by a standard digital computer.

According to a second preferred embodiment, a copperplate style pen is provided whereby lines of greater width are generated if greater pressure toward the paper is applied to the pen, thereby spreading apart the two components of the pen nib and allowing for a wider ink flow path. In a preferred embodiment, pressure is applied to the pen according to an electromagnet acting against the force of a retaining spring. The electromagnet is controlled by a standard digital computer.

According to a third preferred embodiment preselectable variable line width is achieved by selecting the path that the pen will follow for a particular letter of a calligraphic hand by the placement of multiple lines. The lines are spaced apart from each other at a distance (and may also be inclined toward each other) such that the ink placed on the medium by each stroke of the pen flows out both toward the area between lines and away from the lines, such that a single, relatively broad line is formed. In addition, the shape of the broad lines may be controlled. Tapered lines are available that are not available with use of a fixed angular orientation device.

BRIEF DESCRIPTION OF THE FIGURES OF THE DRAWING

FIG. 3a side view of an italic calligraphy style pen including means for registering the angular orientation of the pen with respect to the carrier holder and the stocker holder.

FIG. 3b is a view of the italic pen of FIG. 3a from the front, showing the width of the pen tip.

FIG. 12b is a schematic representation of the paths of the full breadth of the nib according to the path indicated in FIG. 12a.

DETAIL DESCRIPTION OF THE PREFERRED EMBODIMENTS OF THE INVENTION

Figure 1:
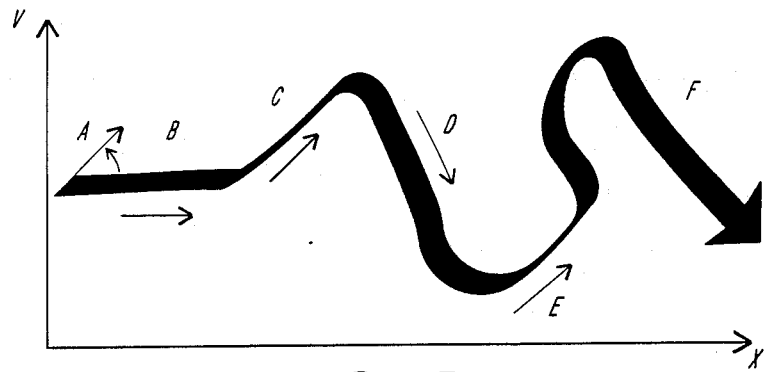
FIG. 1 is a schematic representation of the variation in line width drawn by an apparatus having a pen held at a fixed angular orientation with respect to its direction of motion.
Figure 2:
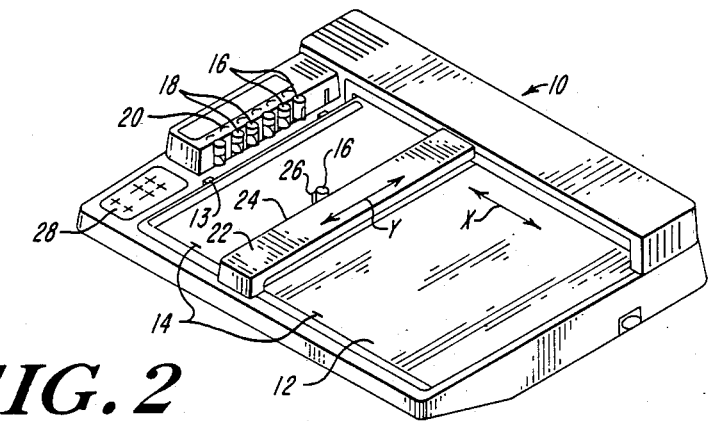
FIG. 2 is a perspective view of an X-Y plotter suitable for use in practicing the invention.

Referring to FIG. 2, a plotter suitable for use in practicing the invention is shown. The plotter has a recording table 12 on which a sheet of paper or other medium on which images are to be plotted is positioned. Holder 13 and guides 14 position and hold the medium. A plurality of pens 16 are mounted in pen holders 18 which form part of pen stocker 20. The pens 16 mounted in stocker 20 may be of different colors, tip thicknesses, tip style (copperplate or italic) line width linkage (variable angular orientation or variable pressure application) or may feature other variations which result in the pen causing different impressions to appear on the paper or other recording medium when the pen is selected for use.

Movement of a pen over table 12 in a first direction is effected by moving slider 22 back and forth over the table in the direction indicated by arrow X. Movement of the pen in a second, orthogonal direction is effected by carriage 24 carried by slider 22. Carriage 24 is movable in the direction indicated by arrow Y and has a pen holder 26 mounted thereon. Movement of slider 22 and carriage 24 as well as the selection of a pen 16 from stocker 20 may be programmed and controlled from operating panel 28, through which a user inputs commands to a microprocessor digital computer (not shown) which controls the motion of the slider, carriage and pen holder.

In operation, carriage pen holder 26 is brought into proximity with a selected one of the stocker pen holders 18 under control of panel 28 and the selected pen 16 is picked up by carriage holder 26. The plotter then operates under control of instructions generated by the digital computer, which instructions are based on either the user inputs through control panel 28 or a previously written software program. The plotter moves slider 22 and carriage 24 through selected paths to cause a desired image or images to be plotted on the paper or other medium positioned on table 12.

Figure 3C:
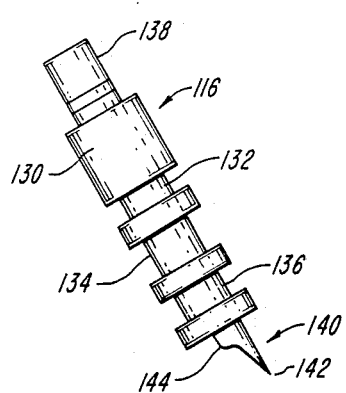
FIG. 3c is a side view of a copperplate calligraphy style pen.

A plotter which operates in the manner indicated is the model NPS-P6 manufactured by Sekonic Co., Ltd, Tokyo, Japan. A device of this type is suitable when using ball point, felt tip, or other pens with substantially radially symmetrical tips. Such devices may control the angular orientation of the pen in the carriage holder when a pen having a radially asymmetric nib or point, such as a fountain pen, is utilized, if a pen and penholder, as described in U.S. Pat. No. 4,736,211, mentioned above, are provided. Such a pen is shown generally at 16 in FIG. 3a, provided with specifically placed projection members 46 and 48. The projecting members mate with corresponding configurations of both the stocker holder 18 and the carriage holder 26 to locate and fix the angular orientation of the pen with respect to the paper.

Referring to FIG. 3a, a pen 16 is shown. The pen has a hollow casing 30 with three grooves 32, 34, 36 formed therein. A threaded tube 38 projects from the top of casing 30 and is adapted to have an ink cartridge mounted thereto. A nib 40 having a point 42 and an ink reservoir 44 projects from the bottom of casing 30. A first projection 46 projects from groove 32 and a second projection 48 projects from groove 34. Projections 46 and 48 mate with corresponding configurations of the stocker holder 18 and the carriage holder 26, as described in detail in the above mention U.S. patent.

Referring to FIG. 3b, the pen 16 is shown from a front view. Nib 40 includes a split end 42, split into leaves 42a and 42b. The ink flows from the reservoir 44 (not shown in FIG. 3b) down channel 50 between leaves 42a and 42b. In a fountain pen, as shown in FIGS. 3a and b, pressing on the point causes the ink to flow to the end of the nib.

Figure 4:
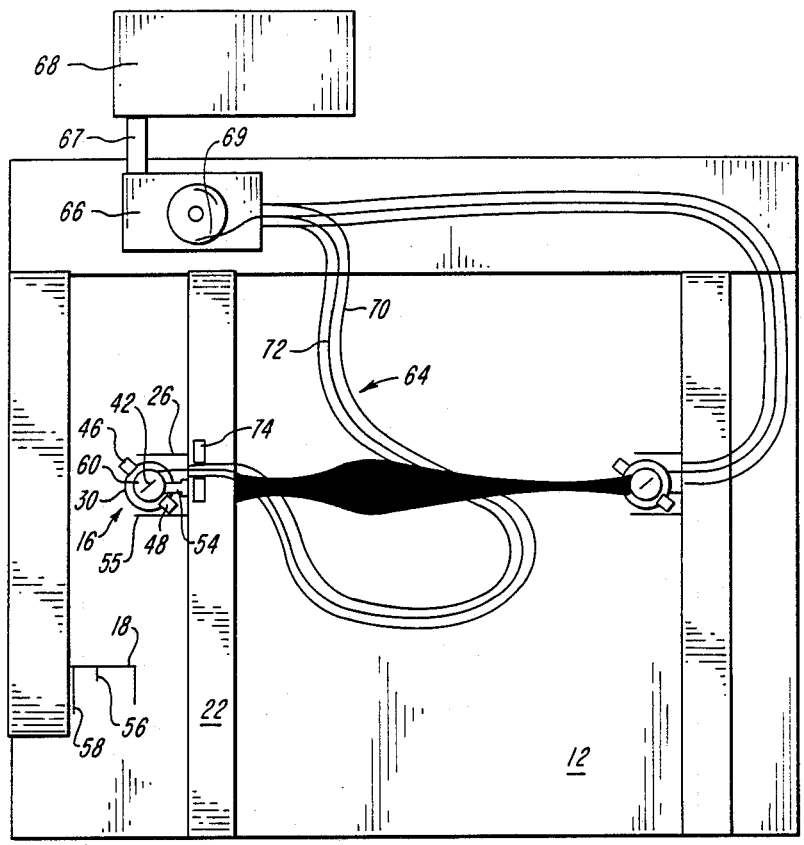
FIG. 4 is a top plan view of a schematic representation of a preferred embodiment of the invention arranged to provide a pen held at variable angular orientation, showing a line drawn by such an apparatus.
Figure 5:
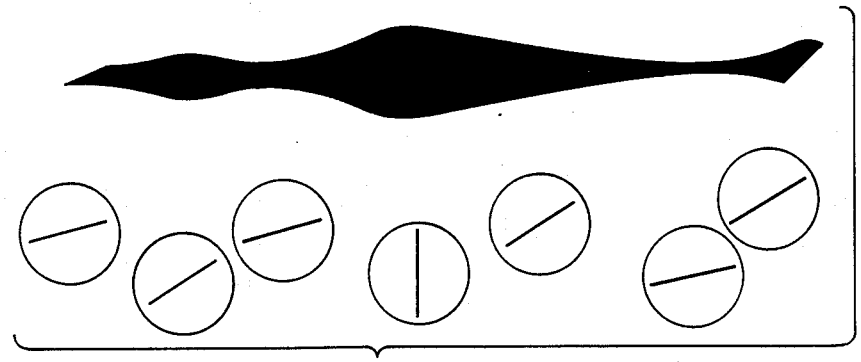
FIG. 5 is a schematic representation showing the angular orientation of the nib at different locations along the line shown in FIG. 4.

Referring to FIG. 4, a preferred embodiment of the invention is shown schematically, adapted to provide for varying angular orientation of the pen nib 40. Like reference numerals refer to components of like function with respect to FIG. 2. A pen 16 is shown held by carriage pen holder 26, attached to slider 22. Pen projection 48 mates with carriage holder 26 through cooperation between latch member 54 and arm 55 of the carriage holder.

Although not shown, it will be understood that when pen 16 is retained in stocker pen holder 18, pen projection 46 mates with latch member 56 and arm 58 of stocker pen holder.

Figure 6:
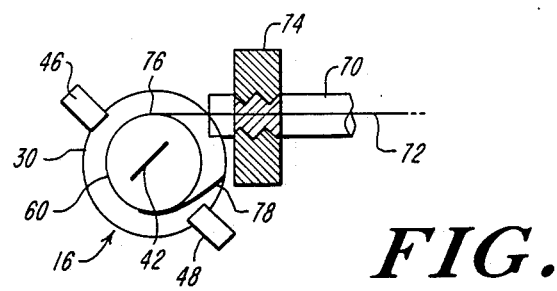
FIG. 6 is a schematic top view of the pen of the apparatus of FIG. 4.

According to a first embodiment of the invention, it is desired to rotate the orientation of point 42 with respect to the table 12 to achieve the desired control over the width of the line drawn. Pen 16 has an inner core 60, to which nib 40 is attached. The core is rotatable about the Z axis with respect to hollow casing 30 to which locating projections 46 and 48 are attached. The pen is also shown schematically in FIG. 6 in an enlarged view. The inner core may be rotatably secured within hollow casing 30 according to various means, such as by journal bearings, a combination of journal and needle bearings, or by other means that will be evident to one of ordinary skill in the art. As the pen moves across the page in both the X and Y directions (as shown schematically in FIG. 4 from the position on the left hand side of the paper to the position shown in phantom on the right hand side of the paper) the pen nib 42 may be rotated about the Z axis such that a straight line of varying widths as shown is drawn. The line shown is greatly exaggerated for purposes of illustration. Rotation of the point is effected by means of cable 64 which is actuated by stepping motor 66, which is in turn controlled by digital computer 68 through signals transmitted over lines 67. Computer 68 may be conveniently integrated with the computer that controls the other plotter operations.

Cable 64 is a hollow flexible cable comprising a sheath 70 and a wire or other form of flexible tension supporting member 72. Cable 64 is similar to cables used for photographic cable switches and for bicycle brake and gear shift cables. The material may be plastic or other synthetic materials, or of metals, or a combination thereof, chosen to provide a maximum strength to weight ratio. Cable 64 is fixed to carriage holder 26 through a suitable fitting shown schematically at 74. Fitting 74 may be attached to carrier 26 in any suitable manner, many of which are known to those of ordinary skill in the art. Tension member 72 passes through casing 62 and attaches to the inner barrel 60 of the pen 16 at fitting 76. The opening in casing 62 may be a slot that extends from the vertical attachment point up to the top of casing 62. It may also be a large circular hole, or any other of a number of suitable openings. The attachment fixture 76 may be of the cylindrical disc type used on bicycle break cables or alternatively the cone shaped type. Additionally, the tension member 72 may be looped at its end and may loop around a projection at 76.

Spring 78 (FIG. 6) restrains the rotation of the inner barrel 60 of the pen 16 against the action caused by tension in wire 72. In the case illustrated, tension in wire 72 will cause the barrel to rotate in a clockwise direction and the spring 78 urges the barrel to return to an original position in a counter-clockwise direction. Spring 78 may be of the constant force type used in retractable electrical cord mechanisms, or retractable tape measures. A projection may be provide on the outer portion of barrel 60 and the inner portion of casing 62 and a simple coil spring may be attached in between. Additional means for arranging spring 78 will occur to those of ordinary skill in the art.

The various variable angular orientations of the pen tip 42 are provided by operating stepping motor 66 to adjust the location of the end of wire 72 that is attached to its output shaft 69. The position of the stepping motor is controlled and monitored by digital computer 68. Digital computer 68 may be under the control of a software computer program into which the angular orientations for all of the letters of the alphabet for a particular calligraphic hand have been stored. Alternatively, it may be controlled by the operator in real time from control panel 28 (FIG. 2) through a joy stick or other suitable control such as a track ball or cursor keys. The required degree of rotation is small and less than one revolution. In most cases, relative rotation of the inner core with respect to the outer core of +45° will be adequate. Depending upon the shape and size of the nib and the calligraphic hand, it may be necessary to provide up to +90° rotation.

It is necessary to provide the outer casing 62 and projections 46 and 48 so that the original orientation of the pen tip 42 with respect to the paper is known and controlled. Otherwise, the capacity to vary the orientation is useless.

It is possible to provide a single stepping motor 66 and cable 64 and to disconnect the cable 72 from the pen 16 when it is desired to change the pen characteristics. It is also possible to provide a plurality of stepping motors and cable assemblies, each dedicated to a specific pen. The choice would be up to the user, depending upon the degree of automation required and the cost requirements of the job.

Figure 7:
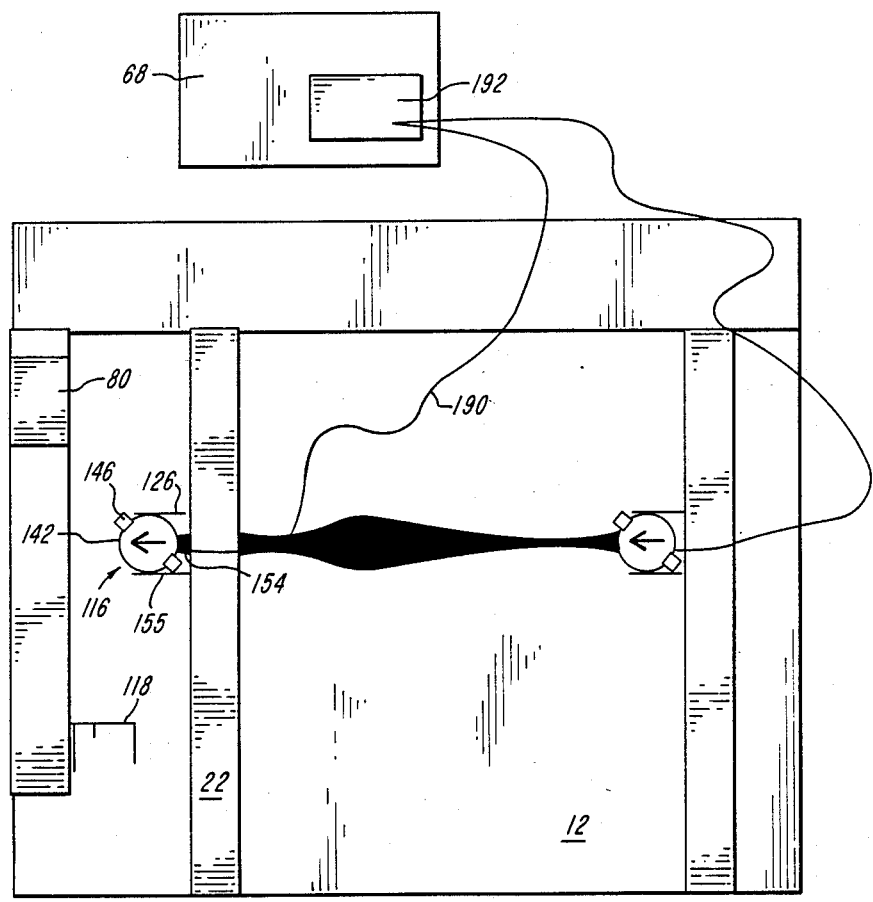
FIG. 7 is a top plan view of a schematic representation of a preferred embodiment of the invention arranged to apply varying pressure to the pen showing a line drawn by such an apparatus.

Referring now to FIG. 7, a preferred embodiment of the invention capable of a variable line width without changing the direction of the pen or the angular orientation of the pen point is shown. This embodiment is capable of simulating copperplate type calligraphic hands. Again, items of similar function are indicated by similar reference numerals. Pen 116 is secured in carriage holder 126 through cooperation between projection 148 and the projections 154 and 155 of the carriage holder. Pen 116 is also adapted to be stored in stocker holder 118 in a similar manner to that discussed above. The orientation of pen tip 142 is indicated by the arrow. The front of the pen faces in the direction of the arrow.

Figure 3D:
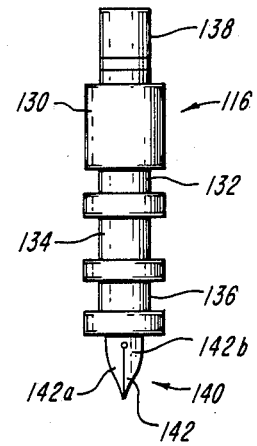
FIG. 3d'-3d are views of the copperplate pen of FIG. 3c from the front, showing the leaves of the pen as different degrees of pressure are applied.
Figure 3D:
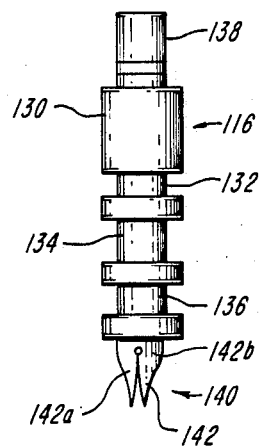
Figure 3D:
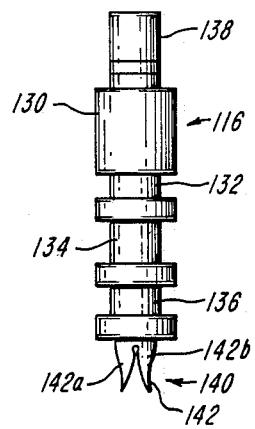

According to the preferred embodiment illustrated in FIG. 7, the width of the line is varied by applying varying pressure in a paperward, i.e. Z direction, to the pen nib 140. The pen nib 140, shown in FIGS. 3c and d, is also split like the italic pen nib of FIGS. 3a and b. However, the tip leaves 142a and 142b form a part of a cone rather than, as with an italic pen, a rectangle. In other words, with an italic pen, simply placing the point on the paper will create a rectangular mark, whereas with a copperplate pen, placing the point on the paper will create a dot. With a copperplate pen, pressing downward on the pen nib 142 with increased pressure causes the leaves 142a and 142b to spread apart as shown in FIGS. 3d'' and 3d'''. As shown in FIG. 3d'-FIG. 3d'''' different amounts of pressure are applied to the pen 116, the least being in FIG. 3d' and the most in FIG. 3d''''. The ink will flow such that the line drawn will be at least the width between the points of the leaves 142a and 142b. The ink will also spread away from the other leaf, so that the line will actually be a bit broader than the distance between the two nib points 142a and 142b. If more pressure than a certain maximum amount is applied, depending upon the viscosity of the ink, the distance between the two nib points of the leaves 142a and 142b might be so great that two individual lines are drawn on the paper, because the ink does not flow a great enough distance to meet at the midline.

According to the present invention, the pen may be of a fountain reservoir type, or a dipped type. Traditionally, copperplate calligraphic writing has used a shellac based ink. Shellac based ink provides an extremely dense pigment (black, white, red, etc.). However, shellac based inks dry very quickly and therefore it is difficult to use such an ink with a reservoir type pen such as a fountain pen. The ink in the reservoir, and in the channel supplying the point dries up even during the period of use. Therefore, traditionally shellac based inks are dipped from an independent well. According to the present invention, it is possible to use a pen 116 that is either a fountain pen, if shellac based inks are not used, or that is a dipped pen, if shellac based inks are used. If a dipped pen is used then barrel 138 will not be attached to a cartridge for filling the pen.

Figure 8:
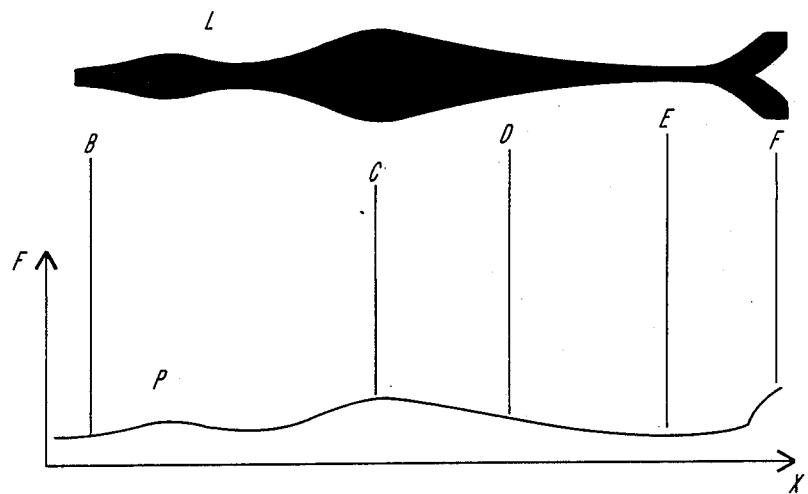
FIG. 8 is a schematic representation showing the relationship between the pressure applied to the pen and the signal applied to the electromagnet on the one hand and the portion of the line drawn by the apparatus in FIG. 7 on the other hand.

Referring to FIG. 8, the relationship between the pressure applied to the pen and the line width is shown schematically. In FIG. 8, a line L is shown, corresponding to the line drawn by the apparatus in FIG. 7. The curve at P indicates the pressure applied to the pen. Pressure is charted on the F axis. Position in the X direction is charted along the X axis. As can be seen at location B where the line is narrow, the pressure applied is relatively low. At point C where the line is wide the pressure is high, as compared to the pressure at B. Similarly, the line width and pressures correspond at points D and E. At point F, a situation is shown where the pressure is so high that the individual leaves 142a and 142b spread apart to such a degree that the ink from each leaf point did not flow a sufficient degree to meet at the midpoint there between.

In operation, the pen, if of a dipped type, will be dipped in ink reservoir 80. Dipping of the pen may be accomplished using either a simple solenoid actuated positioner attached to the carriage holder 126 and controlled by the computer 68 which is used to place the pen on the paper and to lift it from the pen during non-writing strokes. Applicant's copending, U.S. Ser. No. 934,950, filed Nov. 26, 1986, describes means for controlling an automated pen for calligraphic writing and is incorporated herein by reference. That invention also provides an apparatus and method for periodically moving the pen to a designated location on the table and to draw a stroke there, to maintain the free flow of ink. The same apparatus and method can be used to periodically dip the pen 116 in ink reservoir 80.

Figure 9:
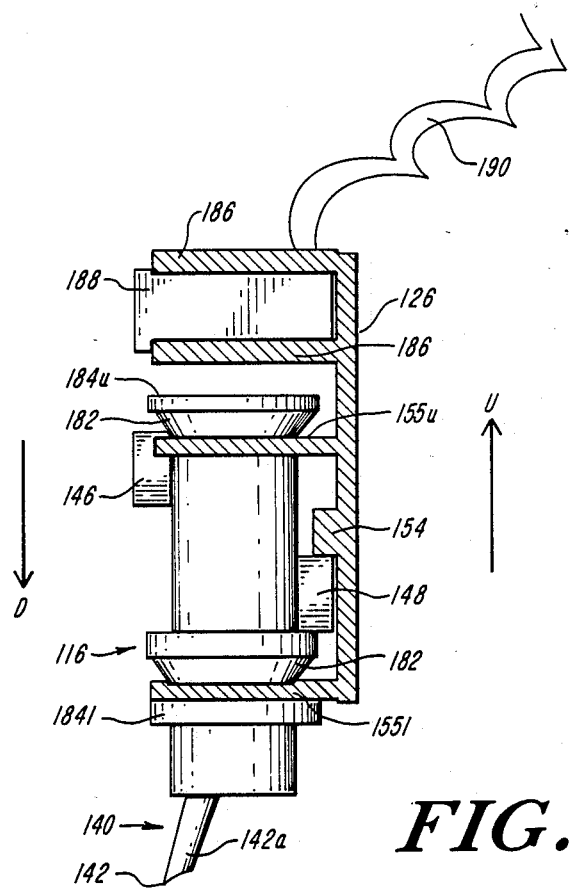
FIG. 9 is a schematic side view of a copperplate style pen as used in the apparatus of FIG. 7.
Figure 10:
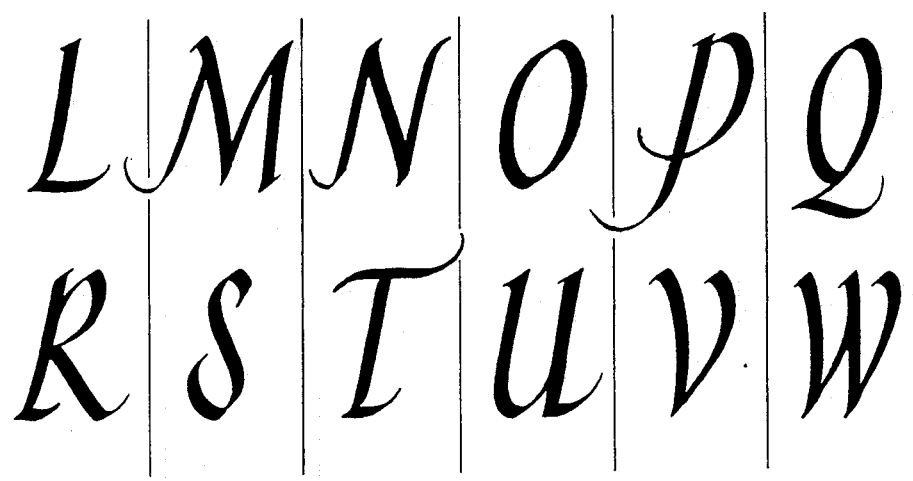
FIG. 10 is an example of an italic style calligraphic hand.
Figure 11:
FIG. 11 is an example of a copperplate style calligraphic hand.

The apparatus which applies pressure to the pen nib is illustrated in FIG. 9. Pen 116 is carried in carriage pen holder 126. It is held in angular registration through means of projection 148 which cooperates with member 154 of the carriage pen holder 126. The pen 116 is held in carriage pen holder 126 by arms 155l and 155u. Spring members 182 are interposed between a support 155u and 155l and support rings 184u and 184l respectively. Springs 182 may be beveled washer springs as shown, or simple coil springs. Upper element 184u is made of a material upon which a force acts when placed in a magnetic field. It may be, for instance, of a ferromagnetic material. Retained between arms 186 of carrier 126 is an electromagnet 188. The electromagnet 188 is connected through wire 190 to a digital to analog converter 192 that is integrated with digital computer 68.

The electromagnet 188 is not energized when the pen is at rest. The springs 182 urge the pen 116 upward and away from the drawing table in the direction shown by arrow U. As a current is applied to the electromagnet 188, the electromagnet is arranged to repel the ferromagnetic element 184u of the pen 116 and forces the pen 116 toward the paper in the direction of arrow D. It will be understood by those of ordinary skill in the art that the force generated between the electromagnet and the ferromagnetic portion of the pen 116 is related to the current applied to the electromagnet. Thus, by varying the current between 0 and a predetermined maximum amount, the pressure applied by the pen 116 to the paper can be varied through a corresponding range of pressures. The digital computer may be programmed to generate digital signals representative of the desired current, which are translated by the digital to analog converter 192 into a current that is suitable to actuate the pen. Very small pressures are required, no greater than the several ounces that would be applied by the human calligrapher. Dot matrix printer printing heads employ a similar electromagnetic arrangement to propel the printing pins toward the paper printed upon.

Although the foregoing described electromagnetic arrangement is the preferred mode of implementing this embodiment of the invention, other arrangements are possible. The ferromagnetic element 184u may form the core of a solenoid electromagnet. Alternatively, a stepping motor of the type used with respect to the variable angle pen discussed above could be connected through a suitable linkage to a screw device attached to the pen 116 and carriage pen holder 126. A displacement in the stepping motor would cause a corresponding displacement with respect to the screw device which would increase or decrease the pressure applied to the point 142. However, this method would be subject to the drawback that it will produce a position, rather than a force or pressure and the position may vary depending upon the size of the pen, imperfections of the paper, variations in the carriage holder, etc. Because the length of travel of the pen is exceedingly small, these variations are on an order of magnitude sufficiently large to disrupt the orderly drawing of the lines. Other means for effecting the pressure control, such as hydraulic and pneumatic methods, will be apparent to one of ordinary skill in the art. It will be understood that the carriage pen holder 126 must be sufficiently rigid to withstand the forces generated by whatever means is chosen.

The pen 16 and carrier pen holder 26, may be designed such that both variable angular orientation and variable pressure embodiments may be employed either simultaneously or in the same project. Traditionally, variable angular orientation (italic) styles and copperplate styles have not been used simultaneously or in the same project, because the traditional tools did not facilitate such use. However, it is likely that because the present invention permits such combined use, new techniques combining both known techniques will be developed.

Finally, rather than employing the pen holder and nib arrangements discussed above, it may be desirable to generate the equivalent of varying line widths using multiple passes of the pen. This will result in slower performance, and will require more work at the stage where the hands are designed. However, the cost of the equipment will be reduced.

Figure 12A:
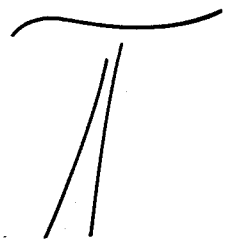
FIG. 12a is a schematic representation of the locations where the center of a nib will travel according to the embodiment of the invention providing for multiple passes of the pen.
Figure 12B:
Figure 12C:
FIG. 12c a schematic representation of the letter produced by the multiple parallel passes illustrated in FIGS. 12a and b as the ink flowed together.

Referring to FIG. 12, the apparatus and method of writing lines of varying widths without changing the orientation of the pen, by drawing multiple substantially parallel lines is illustrated with respect to the letter "T". FIG. 12a shows the path along which the tip of a fixed angle pen will follow for three separate path segments. FIG. 12b shows the extent of travel along the path segments of FIG. 12a, indicating the path of the full width of an italic pen, shown in FIG. 3b. In actual practice, the ink will spread outward from the actual path of the pen nib. However, FIG. 12b shows the actual travel path of the pen nib tip 42. FIG. 12c shows the letter "T", as drawn by the pen 16 traveling on the three paths indicated in FIG. 12b, after the ink has spread outward from the center of the travel path (shown in FIG. 12a).

It will be understood that the exact placement of the lines varies depending upon the ultimate shape desired, the absorbency of the paper, the viscosity of the ink and the shape of the nib 42. It will also be understood that although the maximum distance across which the ink will flow is critical and should be known, it is not necessary that all lines be spaced the maximum distance from each other. If they are placed more closely, the ink spreading from each line will simply overlap, which does not detract from the appearance of the letters. In order to draw a line having a varying breadth along its length, it may be desired to draw two lines inclined toward each other. Thus, the end of the composite line where the two lines are nearer to each other, will be narrower than the end where they are farther apart. In other instances, for instance to draw a line that bulges in the middle, parallel lines may be chosen.

The foregoing discussion should be considered to be illustrative and not limiting in any sense. Specifically, the apparatus disclosed above, although specifically adapted for calligraphic writing, may be used for any purpose where lines of variable widths independent of direction or shape must be drawn, such as architectural, graphics design, etc. Variations and equivalent mechanisms will be evident to those of ordinary skill in the art.

What is claimed is:

1. An apparatus for drawing with an ink pen having a radially asymmetric nib, comprising:
   a. a plotter having:
      i. a table for receiving medium upon which said pen will draw;
      ii. a pen slider translatable with respect to said table parallel a first axis (nominally designated the "X" axis); and
      iii. a pen holder for receiving said pen, mounted on said slider and translatable with respect to said slider parallel a second axis (nominally designated the "Y" axis), orthogonal to said first axis, said pen holder including means for maintaining said pen substantially parallel to and at a known angular orientation with respect to a third axis (nominally designated the "Z" axis) perpendicular said X and Y axes and said pen is rotatable about said Z axis; and
   b. means for selectively varying the angular orientation of said pen nib with respect to said Z axis, thereby controlling said pen to apply ink of selectable and variable widths along a line independent of the shape of the line or its orientation with respect to the X and Y axes.

2. The apparatus of claim 1, wherein said means for selectively varying the angular orientation of said pen nib comprises:
   a. a means for position indexing having an output member that indexes through preselectable positions; and
   b. means for mechanically linking said output member of said indexing means with said rotatable pen such that a position of said output member corresponds to a predetermined angular orientation of said pen.

3. The apparatus of claim 2, further comprising a digital computer which controls said means for selectively varying the angular orientation of said pen nib.

4. The apparatus of claim 3 wherein said means for indexing comprises a stepping motor.

5. The apparatus of claim 4 wherein said means for mechanically linking said output member to said rotatable pen comprises a flexible sheathed cable.

6. The apparatus of claim 5 wherein said pen comprises:
   a. a first cylindrical tube connectable to said pen holder and maintainable at a fixed angular orientation with respect to said Z axis; and
   b. an elongate member concentric and inside of and rotatably mounted with respect to said first cylindrical tube;
      i. wherein said elongate member carries a pen nib; and
      ii. wherein said means for mechanically linking said output member to said pen is attached to said elongate member to effect the rotation thereof.

7. The apparatus of claim 1, further comprising means for selectively varying the pressure between said pen nib and said medium upon which said line is being drawn.

8. An apparatus for drawing with an ink pen having a copperplate style nib, comprising:
   a. a plotter having:
      i. a table for receiving medium upon which said pen will draw;
      ii. a pen slider translatable with respect to said table parallel a first axis (nominally designated the "X" axis); and
      iii. a pen holder for receiving said pen, mounted on said slider and translatable with respect to said slider parallel a second axis (nominally designated the "Y" axis), orthogonal to said first axis, said pen holder including means for maintaining said pen at a known angular orientation with respect to a third axis (nominally designated the "Z" axis) perpendicular said X and Y axes; and b. means for selectively varying the pressure between said pen nib and said medium upon which said line is being drawn, thereby controlling said pen to apply ink of selectable and variable widths along a line independent of the shape of the line or its orientation with respect to the X and Y axes.

9. The apparatus of claim 8, further comprising a digital computer which controls said means for selectively varying the pressure between said pen nib and said medium 10. The apparatus of claim 9 wherein said means for selectively varying the pressure comprises:
   a. mounted to said pen holder, means for generating a selectively and variably energizable magnetic field; and
   b. mounted to said pen, a member upon which a force is applied in the presence of a magnetic field;
such that energization of the magnetic field applies a force to the member mounted to said pen, thereby applying pressure to the pen in a direction toward the medium upon which the line will be drawn.

11. The apparatus of claim 10, said means for generating a magnetic field comprising an electromagnet.

12. The apparatus of claim 11, said electromagnet being an element of a solenoid and said member mounted to said pen being the core of said solenoid.

13. The apparatus of claim 8, said copperplate style nib having a pair of separable leaves which, when under minimal pressure, join to print a dot on the drawing medium and a maximum leaf separation under operationally reasonable pressure of at least 10 times the diameter of the dot drawn by the pen under minimal pressure.

14. An apparatus for drawing with an ink pen having a radially asymmetric nib, comprising:
   a. a plotter having:
      i. a table for receiving medium upon which said pen will draw;
      ii. a pen slider translatable with respect to said table parallel a first axis (nominally designated the "X" axis);
      iii. a pen holder for receiving said pen, mounted on said slider and translatable with respect to said slider parallel a second axis (nominally designated the "Y" axis), orthogonal to said first axis, said pen holder including means for maintaining said pen at a known angular orientation with respect to a third axis (nominally designated the "Z" axis) perpendicular said X and Y axis; and
   b. means for applying ink along a first line; and
   c. means for applying ink along at least one additional line closely adjacent a portion of said first line such that the ink along both lines is contiguous along a portion of said at least one additional line, thereby controlling said pen to apply ink of selectable and variable widths along a line independent of the shape of the line or its orientation with respect to the X and Y axes.

15. The apparatus of claim 14, further comprising a digital computer for controlling said means for controlling the motion of the slider and the pen carrier.

16. The apparatus of claim 15, wherein said means for applying ink along a first line and along at least one additional line and the means for controlling the motion of the slider and the pen carrier comprises the digital computer.

17. A method for drawing with an ink pen having a radially asymmetric nib, comprising:
   a. provides a plotter having:
      i. a table for receiving medium upon which said pen will draw;
      ii. a pen slider translatable with respect to said table parallel a first axis (nominally designated the "X" axis); and
      iii. a pen holder for receiving said pen, mounted on said slider and translatable with respect to said slider parallel a second axis (nominally designated the "Y" axis), orthogonal to said first axis, said pen holder including means for maintaining said pen at a known angular orientation with respect to a third axis (nominally designated the "Z" axis) perpendicular said X and Y axes; and
      iv. means for controlling the motion of the slider and pen carrier;
   b. applying ink along a first line; and
   c. applying ink along at least one additional line closely adjacent a portion of said first line such that the ink along both lines is contiguous along a portion of said at least one additional line, thereby controlling said pen to apply ink of selectable and variable widths along a line independent of the shape of the line or its orientation with respect to the X and Y axes.

* * * * *